United States Patent Office 2,902,474
Patented Sept. 1, 1959

2,902,474

1,3 BIS (3-ISOCYANATO-O-TOLYL) UREA AND CURING POLYURETHANE ELASTOMERS THEREWITH

Robert G. Arnold, Salem, N.J., and Donald M. Simons, Wilmington, Del., assignors to E. I. du Pont de Nemours and Company, Wilmington, Del., a corporation of Delaware No Drawing. Application January 25, 1956
Serial No. 561,347

3 Claims. (Cl. 260—77.5)

This invention relates to a new chemical product and more particularly to 1,3-bis(3-isocyanato-o-tolyl) urea.

It is known that isocyanate-based elastomers containing active hydrogen atoms may be compounded with an organic diisocyanate and then heated so as to effect a cure. One of the problems encountered in this curing procedure, however, is that of scorching or premature curing since the diisocyanate curing agent starts to react immediately with the elastomer and thus the compounded mass is not very stable. This great reactivity of the diisocyanate curing agent means that the time lag between compounding and curing must be very short and with some diisocyanate curing agents which react very fast, scorching will take place during the compounding operation on the roll mill unless extreme care is used.

It is an object of this invention to provide a new chemical compound. A further object is to provide a new compound which can be used effectively as a curing agent and which does not present the problems which have heretofore been encountered. A still further object is to provide a method for curing isocyanate-based elastomers containing active hydrogen atoms with this new compound. Other objects will appear hereinafter.

These and other objects of the following invention are accomplished by providing a new bis-urea formed from toluene-2,6-diisocyanate. More particularly, the compound is 1,3-bis(3-isocyanato-o-tolyl) urea, having the formula

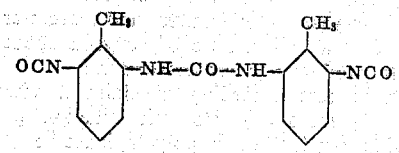

This compound may be prepared by reacting, in a suitable inert solvent, about 1 molar part of water with about 2 molar parts of toluene-2,6-diisocyanate at a temperature between 0 and 30° C. The resulting insoluble 1,3-bis(3-isocyanato-o-tolyl) urea is recovered from the solvent by filtration. Preferably the reaction is carried out at a temperature of about 25° C.

The inert solvent which is used should be one which dissolves the toluene-2,6-diisocyanate reactant and at least part of the water, that is the water which is required for the reaction with the diisocyanate. In addition, the solvent must also be free from groups which are reactive with isocyanates, for example, those containing active hydrogen atoms. Another qualification for the solvent is that it must not dissolve the 1,3-bis(3-isocyanato-o-tolyl) urea. Suitable solvents include ethers, such as anhydrous ether, diethyl ether and dichloroethyl ether; ketones, such as acetone, methylisobutyl ketone and methylamyl ketone; and esters, such as ethyl acetate, isopropyl acetate and ethyl chloroacetate. Mixtures of solvents may be used, such as a mixture of 90% n-heptane and 10% dioxane by volume.

In general, the quantity of solvent used is not critical. Enough should be used so that the precipitated 1,3-bis(3-isocyanato-o-tolyl) urea can be filtered readily and the unreacted diisocyanate washed out of the precipitate. Excessive amounts of solvent should be avoided since it brings about excessive dilution which is wasteful and causes useless handling of the greater quantity of solvent.

The amount of water which is used should be approximately the theoretical amount required to react with two isocyanate groups; however, this ratio may be varied from more than 2:1 to about 1:1 in actual preparation. It is possible to vary this molar ratio since the water sensitivity of the resulting urea compound is not very great and, in fact, is so insoluble that it precipitates from solution and can then no longer enter into reaction with more water.

As the reaction of toluene-2,6-diisocyanate with water proceeds, the resulting 1,3-bis(3-isocyanato-o-tolyl) urea precipitates and may be filtered off or otherwise separated from the solvents or from unreacted diisocyanate. This precipitate is then washed with a little solvent and is dried, preferably in a vacuum oven. The solvent which is used may be recycled and further used. The 1,3-bis(3-isocyanato-o-tolyl) urea is obtained as a white, crystalline material which is stable in storage and is easily handled.

The new compound of the present invention may be employed in the same manner as other diisocyanates; however, it is particularly useful as a curing agent for isocyanate-based elastomers possessing active hydrogen atoms. It is particularly useful for curing elastomers which have been prepared from a polyalkylene ether glycol, an organic diisocyanate and a chain-extending agent containing a plurality of active hydrogen atoms, no more than two atoms in the molecule having active hydrogen attached thereto, and also for elastomers which have been prepared in a similar manner from a polyester. Elastomers prepared from a polyalkylene ether glycol are more particularly described and claimed in co-pending application of Hill, Serial No. 365,270, filed June 30, 1953. Elastomers prepared from a polyester are described in Angewandte Chemie 62, 57–66 (1950) and in U.S. Patents 2,621,166, 2,625,531, and 2,625,532. The polyurethane elastomeric reaction products prepared from a polyalkyleneether glycol or a polyester glycol as described in the above-referred to references will contain a plurality of intralinear polyoxyalkylene or polyester groups and a plurality of urethane linkages of the formula —NH—COO—, with the polyoxyalkylene or polyester groups being connected to the terminal oxygen atoms of said linkages. When the 1,3-bis(3-isocyanato-o-tolyl) urea is compounded with these isocyanate-based elastomers as a curing agent, the elastomers are quite surprisingly resistant to scorch during processing. It is to be understood that the new compound of the present invention has application generally to the curing of any elastomeric materials composed of polymeric chains containing reactive hydrogen atoms and which may be cured by cross-linking at the active hydrogen sites. This new compound is particularly useful in the curing of elastomers having terminal amine groups. Since amine groups are quite reactive with diisocyanates, many of the prior art diisocyanate curing agents cannot be used, since they cause scorching before they can be milled uniformly into the amine-terminated elastomer.

In using the new compound of the present invention as a curing agent, it is sufficient merely to mix the compound with the isocyanate-based elastomer and to thereafter heat the resulting mixture. In general, from about 1 to 20 parts by weight of the 1,3-bis(3-isocyanato-o-tolyl) urea per 100 parts by weight of the isocyanate-based elastomer should be used. Temperatures in the range of about 80 to 175° C. are sufficient in order to effect a cure.

The following example will better illustrate the nature of the present invention; however, the invention is not intended to be limited to this example.

In order to particularly illustrate the advantage of the new compound of the present invention, the following example has compared its use as a curing agent with that of its position isomer 1,3-bis(3-isocyanato-p-tolyl) urea. This latter compound is more particularly described and claimed in U.S. Patent 2,757,185. It is readily apparent from the following example that 1,3-bis(3-isocyanato-o-tolyl) urea will be highly useful as a curing agent in a rubber-processing field such as tire building where it is usually desirable to be able to store a compounded stock for several days before forming the final structure, molding and curing.

EXAMPLE 1

A. Preparation of 1,3-bis(3-isocyanato-o-tolyl) urea 18 parts of water is dissolved in 4,550 parts of dry ether and then 174 parts of toluene-2,6-diisocyanate is stirred in. Agitation at 20-25° C. is continued for 12 hours and then the system is permitted to stand for 4 days. The insoluble precipitate is filtered off, washed with ether and dried under vacuum. 155 parts of fine, nearly white, crystalline material is obtained which analyzes for 1,3-bis(3-isocyanato-o-tolyl) urea.

B. Preparation of elastomer 200 parts of polytetramethylene ether glycol having a molecular weight of approximately 1,000 is placed in a Werner-Pfleiderer mixer with 23.3 parts of toluene-2,4-diisocyanate and mixed for 3 hours at 100° C. to form a polyurethane glycol. The mass is cooled to 70-75° C. and 0.38 part of water is added. Mixing is then continued for an additional 15 minutes. Then 26.5 parts of toluene-2,4-diisocyanate is added and mixing at 70-75° C. is continued for 2 hours, after which 8.35 parts of water is added. Mixing is continued for 21 minutes while the temperature rises to 99° C. A rubbery mass is obtained and is immediately transferred to a rubber roll mill and sheeted out while 1.5 parts of piperidine is milled in to stabilize the polymer. The polymer is then sheeted off the mill.

C. Curing of elastomer

Several 100-part portions of the stabilized polymer are then compounded on a rubber roll mill with 4 parts of 1,3-bis(3-isocyanato-o-tolyl) urea and the resulting stocks are stored at room temperature and 50% relative humidity. Control stocks are made in the same way using 1,3-bis(3-isocyanato-p-tolyl) urea for comparison. The Mooney Scorch Test ("A.S.T.M. Standards on Rubber Products," D-1077-49T) with the small rotor at 250° F. is used to measure the resistance to scorch at intervals thereafter. The data are shown in the table below.

| Age of Compounded Stock, Days | Stocks Compounded With— | | | |
|---|---|---|---|---|
| | 1,3-bis(3-isocyanato-o-tolyl) urea | | 1,3-bis(3-isocyanato-p-tolyl) urea | |
| | Low Point | Time to 10 Point Rise, Minutes | Low Point | Time to 10 Point Rise, Minutes |
| 0 | 58 | 18 | 75 | 10 |
| 1 | 59 | 24 | 79 | 12 |
| 2 | 64 | 22 | 90 | 18 |
| 3 | 63 | 26 | 99 | |
| 8 | 64 | 35 | 112 | |
| 10 | 70 | 35 | | |

The results clearly show the superiority of the 1,3-bis(3-isocyanato-o-tolyl) urea as a curing agent. At the end of 10 days the compounded stock has a low reading below that of the 1,3-bis(3-isocyanato-p-tolyl) urea stock immediately after compounding. At 7 days the 10 point rise value to 74 after 35 minutes is essentially the same as the control at 0 days. This very great improvement in scorch resistance and variation from the known 1,3-bis(3-isocyanato-p-tolyl) urea is most surprising and unexpected. The 1,3-bis(3-isocyanato-o-tolyl) urea also has a considerable margin of superiority in the longer time required at 250° C. for a 10 point rise in the Mooney reading.

When 1,3-bis(3-isocyanato-o-tolyl) urea was compared with 1,3-bis(3-isocyanato-p-tolyl) urea by incorporating equal quantities of two separate samples of an isocyanate-based elastomer and then milling on a rubber roll mill at 100° C., the 1,3-bis(3-isocyanato-p-tolyl) urea showed scorch in 5 minutes while the 1,3-bis(3-isocyanato-o-tolyl) urea had not reached that point after 30 minutes.

As many widely different embodiments of this invention may be made without departing from the spirit and scope thereof, it is to be understood that this invention is not limited to the specific embodiments thereof except as defined in the appended claims.

What is claimed is:

1. 1,3-bis(3-isocyanato-o-tolyl) urea having the formula

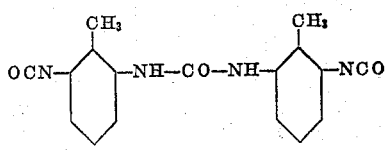

2. In a process of making cured polyurethane elastomers, the steps which comprise mixing (a) 100 parts by weight of an isocyanate-curable, uncured polyurethane elastomeric reaction product containing a plurality of intralinear polyoxyalkylene groups, and a plurality of urethane linkages of the formula

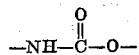

with said intralinear polyoxyalkylene groups being connected to the terminal oxygen atom of said urethane linkages, with (b) from 1 to 20 parts by weight of 1,3-bis(3-isocyanato-o-tolyl) urea, and thereafter heating the mixture to a temperature of between about 80 and 175° C. to produce a cured elastomer.

3. In a process according to claim 2 wherein the uncured polyurethane elastomeric reaction product is the reaction product of a polyalkyleneether glycol, a molar excess of an organic diisocyanate and water.

References Cited in the file of this patent

UNITED STATES PATENTS

| | | |
|---|---|---|
| 2,692,873 | Langerak et al. | Oct. 26, 1954 |
| 2,703,810 | Viard | Mar. 8, 1955 |
| 2,757,185 | Barthel | July 31, 1956 |
| 2,760,953 | Seeger | Aug. 28, 1956 |
| 2,818,404 | Hill | Dec. 31, 1957 |

OTHER REFERENCES

"Chemical Engineering," vol. 57, issue 4, April 1950, pages 165–166.

"Isocyanates," Monsanto Technical Bulletin No. P-125, Monsanto Chemical Co., page 1, Oct. 1, 1951.

Hopkins: "Rubber Age," vol. 78, No. 2, November 1955, pages 239–244.